(12) United States Patent
De Souza Manso

(10) Patent No.: US 8,382,212 B2
(45) Date of Patent: Feb. 26, 2013

(54) TUBELESS STEEL WHEEL

(75) Inventor: Francisco Antonio De Souza Manso, Lorena (BR)

(73) Assignee: Iochpe-Maxion S.A., Cruzeiro-SP (BR)

( * ) Notice: Subject to any disclaimer, the term of this patent is extended or adjusted under 35 U.S.C. 154(b) by 215 days.

(21) Appl. No.: 12/761,543

(22) Filed: Apr. 16, 2010

(65) Prior Publication Data
US 2011/0248553 A1 Oct. 13, 2011

(30) Foreign Application Priority Data
Apr. 9, 2010 (EP) ..................... 10159478

(51) Int. Cl.
*B60B 3/04* (2006.01)
(52) U.S. Cl. ............... 301/63.101; 301/95.101
(58) Field of Classification Search .......... 301/5.24, 301/95.101, 63.101; 152/379.3, 379.4, 381.3, 152/381.4, 384, 427, 428
See application file for complete search history.

(56) References Cited

U.S. PATENT DOCUMENTS

| 4,453,776 A | * | 6/1984 | Rohr | 301/5.24 |
| 5,788,334 A | * | 8/1998 | Renard | 301/5.24 |
| 5,958,160 A | * | 9/1999 | Botte | 152/427 |
| 6,450,226 B2 | * | 9/2002 | DeLacroix et al. | 152/427 |
| 7,014,274 B2 | * | 3/2006 | Guimard et al. | 301/95.101 |
| 2005/0116531 A1 | * | 6/2005 | Lehmann | 301/95.101 |

FOREIGN PATENT DOCUMENTS
EP 2036742 A1 * 3/2009

* cited by examiner

*Primary Examiner* — Kip T Kotter
(74) *Attorney, Agent, or Firm* — MacMillan, Sobanski & Todd, LLC

(57) ABSTRACT

A tubeless wheel for vehicles intended for the transport of loads or large number of passengers, such as trucks or buses, with external valve (8), as well as the products rim (1), disk (2) and valve (8) with the disk (2) mounted on the second ledge (4) of the rim (1). The parts have such geometry that, by a combination of factors distributed between rim (1), disk (2) and valve (8), enable the placement of the valve (8) on the external side of the disk (2) and the valve laying region is defined by two concurrent planes exempt of ribs.

7 Claims, 8 Drawing Sheets

TUBELESS STEEL WHEEL

Figure 1:
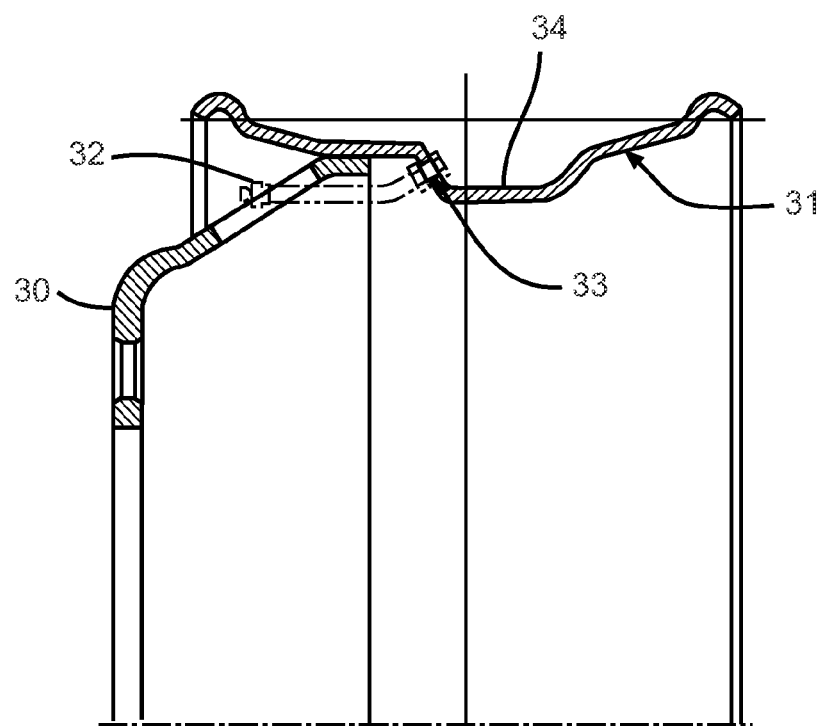

The present invention refers to a tubeless wheel for vehicles intended for the transport of loads or large number of passengers, such as trucks or buses.

DESCRIPTION OF THE STATE OF THE ART

Trucks and buses are classified as all motorized equipment intended for heavy duty, transport of loads or large numbers of passengers.

These vehicles use tubeless wheels made of steel, comprised of two parts, rim and disk, being welded at the joint.

There is a distinction of these tubeless wheel models in relation to the positioning of the tire filling valve, hereinafter referred to as valve. In this sense, internal valves or external valves can be applied depending on the constructive form of the elements that make up the wheel and the type of brakes used by the vehicle, whether drum or disk brakes.

Internal Valve Wheel

In wheels made of steel used in trucks and buses, called internal valve tubeless wheels, the valves are positioned on the side wall of the drop center of the rim, also known as rim ledge, and reach the external region of the wheel by way of one of the disk ventilation holes. This constructive form is possible due to the assembly of the disk in the region of the so-called rim ledge.

Usually, these wheels models are used in heavy vehicles with drum brakes, and can also be used on vehicles with a disk brakes system. In the latter case, there are drawbacks which result from a disposition of the valve passing through the inner part of the rim and which favor the occurrence of accidents, such as a valve being damaged by stones, bits of wood or debris, which enter inside the wheel through the free regions of the disk brake assembly or potential interference with the brake disk itself.

External Valve Wheels

There is known in the state of the art four kinds of arrangements for external valves applied to steel wheels used in trucks and buses.

1) External Valve Seated on the Side Wall of the Rim Ledge:

In this arrangement, the valve is positioned on the wall of the rim ledge and encounters the external region of the wheel by the fact that the disk is mounted on the rim ledge.

This type of construction is used in lower load capacity wheels by the fact that the assembly of the disk is in the region of the rim ledge. This location of the disk causes two disadvantages, namely:

i) the diameter of the rim ledge is reduced and, consequently, the available area for the brake system is also reduced, thus limiting its size and efficiency.

ii) the joint welding with the rim generates a thermally affected zone resulting from the high temperature resulting from the welding process. This thermally affected zone in the region of the rim ledge, which by its construction already presents a high tension level, notably reduces the fatigue stress of the wheel.

Preferably these models are found in slight to medium size vehicles with drum brakes, and can also be applied to vehicles with a disk brake system.

Patent document ES2244471 discloses a wheel according to the arrangement referred to above.

2) External Valve Seated on the Side Wall of the Hump:

This constructive form was created with the purpose of placing the valve on the external side of the disk on tubeless wheels with high load capacity and with a rim equal or less than nine inches in width.

Due to the reduced space on the rim ledge which is used for assembling the disk, the alternative found was to create a hump, that is, a rib created on the profile of the rim during the lamination process.

This rib allows the laying of the valve on its side wall, creating a vertical space in the limited ledge of a tubeless rim whose size is equal or less than nine inches while simultaneously not affecting the end width of the rim. This construction is disclosed in prior art document EP0701911.

However, this kind of arrangement presents a series of drawbacks, such as:

i) location of the hump at the base of the Bead-Seat which is the laying region of the tire, and hereinafter will be referred to as bead seat. When placing the tire on the wheel, it is compulsory to use special equipment for the passage of the tire through the end diameter of the hump, otherwise it may be damaged. This fact is also detrimental to tire-changing operations that are not performed by authorized retailers or well-equipped workshops, since it requires effort by the operator to pass the tire through the hump of the rim during assembly.

ii) tire pressure difficulty due to the fact that the diameter of the rim ledge is less to contribute with more space for the hump. This situation prevents the initial sealing to fill the tire, and it is necessary to resort to the use of special artifices, such as an extra sealing rubber which is expulsed from the rim soon after filling begins.

3) External Valve Seated on the Ledge or on the Bead Seat:

This constructive form was also created with the purpose of placing the valve on the external side of the disk in tubeless wheels with high load capacity and with a rim equal to or greater than 5¼ inches in width.

In the construction with the laying of the valve on the rim ledge, the space in the ledge which is used for assembling the disk, was divided to allow the placement of the valve. The disk in turn, had its profile altered to achieve its laying on the same ledge, after the valve hole. This resource allowed the laying of the external valve on the disk while simultaneously not impacting the final width of the rim.

In the construction with the laying of the valve on the bead seat, the valve hole was made in the bead seat to allow installation of the valve. The disk, in turn, was maintained laid on the rim ledge. This resource also allowed the laying of the external valve to the disk while simultaneously not impacting the final width of the rim.

In a final construction, the laying of the valve is made in a zone united to the bead seat, on the side of the disk by an anti-detachment device, similar to a lug. Again, this resource also allowed the laying of the external valve to the disk while simultaneously not impacting the final width of the rim.

These constructions are disclosed by prior art document EP 0 755 807 B1.

However, this kind of arrangement also presents a series of drawbacks, such as:

i) the location of the valve hole in the ledge of the rim or in the bead seat, with the nut partially inbuilt as shown in the technical drawings:
  a) It requires a nut with a sealing system and reduced tolerances to avoid the escape of air.
  b) The reduced tolerances are only assured by machining of this hole, making the manufacturing process more prolonged and expensive.

c) Removal of the material from the hole by machining, without the inbuilt hole process and ledge of the seat, obtained by stamping, may act as a tension concentrator.

d) The option where the valve is seated in the bead seat, after the point of junction of the ledge is even more worrying, since the bead of the tire may stop on the valve nut, obstructing its hole and preventing the tire from being filled.

e) Lastly, the laying of the valve in the zone united to the bead seat, on the side of the disk by an anti-detachment device of the tire, demonstrates that, despite the author's concern with this important safety test, a mini-ledge was created, intermediary, inefficient against the movement of the bead of the tire, when in low pressure arising from the loss of air.

ii) The introduction of the step of the rim, with ratio R defined by the author, as being R≧0.65 and ideally R≧0.75 to assure a better fatigue stress of the assembly, was shown to be insufficient, since ratios less than R≦0.60 and consequently more accentuated steps, show superior performance and in more much demanding tests such as the BiAxial (ZWARP Test—Fraunhofer Institute/Germany).

iii) The introduction of the step on the rim ledge, contrary to flat ledge, proved to be an excellent reinforcement for the rim, in the swinging region after laying of the disk.

4) External Valve Seated on the Wall of a Step of the Rim:

This constructive form was also created with the purpose of placing a valve on the external side of the disk in tubeless wheels with high load capacity and with a rim width equal or greater than 5¼ inches.

In the construction with the laying of the valve on the wall of a step of the rim or first connection area of the rim, the space in the rim ledge which is used for assembling the disk, was divided and separated to allow the placement of the valve on the wall of this gap (or step). Hence the profile of the rim, on the side of the disk, is comprised of a flange connected to the bead seat, connected to a cylindric wall (or first ledge) of length "P", linked to the first connection area (or wall of the step), which in turn, is linked to the second connection area (or second ledge). The disk in turn, had its profile altered to achieve its seat on the second ledge (or second connection area), after the valve hole. This resource allowed the laying of the external valve to the disk while simultaneously not impacting the end width of the rim.

This construction is disclosed in prior art document EP 1 106 388 B1.

However, this kind of arrangement also presents a series of drawbacks, such as:

i) Although the introduction of the step on the rim is an excellent reinforcement for the rim, in the swinging region after laying the disk, the placement of the valve hole on the first connection area (or wall of the step), creates a dangerous tension concentrator at the base of this step. This fact was identified upon analyzing the model suggested by the author, by way of the finite elements method.

ii) The definition of the width "P" for the cylindric wall (or first ledge), belonging to ratio [p/φ×1000]≦35, as being ideal for the tire withdrawal test, is less than values [p/φ×1000]≧37, since the length of this first ledge "P" is directly proportional to this ratio and it is also known that the greater P is, so much the better is its retention capacity against the movement of the tire bead, when under low pressure resulting from loss of air.

iii) The author also cites the existence of a "prominent" tapering, which can be up to 10° in relation to the axis axial, in the inner region of the $2^{nd}$ connection area (or second ledge). This prominent tapering, precisely in the seat region of the disk, may cause a tension concentrator due to the assembly and seating of the disk in a conical region or due to the flange created by the mark. This resource is commonly used on flat ledge wheels to avoid material from being ripped off, when the disk is mounted on the rim with interference. On wheels with ledge gap (step), the creation of a conical region defined by a mark or flange may generate high tensions damaging the fatigue stress of the wheel.

For this reason, it is important to emphasize the need to satisfy the market with tubeless wheels for trucks and buses, in width equal or greater than 133.35 mm (5¼ or 5.25 inches) and with external valve capable of overcoming the drawbacks of the state of the art.

OBJECTIVES OF THE INVENTION

It is, therefore, a first objective of this invention to provide a tubeless steel wheel for vehicles intended for the transport of loads or large number of passengers, such as trucks or buses comprised by a rim, a disk and a valve, wherein the rim is sized equal or greater than about 5¼ or 5.25 inches in width, the rim comprising, from the side where the disk is mounted, a rim flange adjacent to a bead seat, the bead seat adjacent to a first rim ledge which joins to a gap area (or step), step adjacent to a second ledge, which joins to the rim ledge by means of a side wall, the rim also comprises a region for laying the valve which is disposed exactly on the junction point of the bead seat and the start of the first ledge, the disk containing an end portion associated to the second rim ledge, wherein the region for laying the valve is defined by two concurrent planes exempt of ribs and the valve, after laying, is positioned on the outside of the wheel such that it does not touch the external face of the disk or invades the inner part of the wheel by way of the ventilation hole.

A second objective of this invention is to provide a tubeless wheel, having an external valve, with width being equal or greater than about 5.25 inches for use in trucks and buses equipped with disk brakes, where the rim in combination with the disk and the valve angle, allows the placement of an external valve to the disk without the need to create a hump on the rim.

Another objective of the present invention is to provide a tubeless steel wheel, having an external valve, with the width being greater or equal than 5.25 inches, where the ratio $$R = \frac{(\phi_M - \phi_D)}{(\phi_B - \phi_D)}$$

of the wheel should be equal or less than 0.60.

A further objective of the present invention is to provide a tubeless steel wheel, where the first ledge adjacent to the bead seat on the side of the disk has a width "L", having equal diameter as the start of the bead seat and also, the diameter of the wheel is $\Phi_N$, where the ratio $[L/\Phi_N \times 1000]$ is equal or greater than 37.

BRIEF DESCRIPTION OF THE INVENTION

One of the above objectives is achieved by means of a tubeless steel wheel for vehicles intended for the transport of loads or large number of passengers, such as trucks or buses, the wheel comprised by a rim, a disk and a valve, wherein the rim is sized equal or greater than about 5.25 inches in width, the rim comprising, from the side where the disk is mounted, a rim flange, adjacent to a bead seat, the bead seat being adjacent to a first rim ledge, the first ledge joining to a ramp, the ramp being adjacent to a second ledge, which joins to a rim ledge by means of a side wall, the disk containing an end portion associated to the second rim ledge, the valve hole being disposed at a junction point formed at the intersection between the bead seat and the first ledge.

Further, the objectives of the present invention are achieved by a wheel where the first ledge adjacent to the bead seat on the side of the disk has a width "L", having equal diameter as the start of the bead seat and also, the diameter of the wheel is $\Phi_N$, where the ratio $$[L/\Phi_N \times 1000]$$

is equal or greater than 37.

The objectives of the present invention are also achieved by means of a tubeless steel wheel for vehicles intended for the transport of loads or large number of passengers, such as trucks or buses, the wheel comprising a rim, a disk and a valve, wherein the rim is sized equal or greater than about 5.25 inches in width, the rim comprising, from the side where the disk is mounted, a rim flange, adjacent to a bead seat, the bead seat being adjacent to a first ledge of the rim, the first ledge joining a ramp, the ramp being adjacent to a second ledge, which joins to a rim ledge by means of a wall, the disk containing an end portion associated to the second rim ledge, $\Phi_D$, the diameter of the surface being radially inside the rim ledge, $\Phi_M$ the diameter of the surface being radially inside the second ledge, diameter taken axially to the end of the wheel disk, $\Phi_N$ the diameter of the surface being radially inside the start of the bead seats, $\Phi_B$ diameter taken axially at the point of junction of the bead seat, adjacent to the first ledge, the ratio $$R = \frac{(\phi_M - \phi_D)}{(\phi_B - \phi_D)}$$

is equal or less than 0.60.

This innovative constructive form is designed to overcome the flaws in the state of the art such that the new wheel arrangement presents characteristics that result in countless advantages, such as:
- Eliminating the need to create a hump in the rim for rims with width equal or greater than 5.25 inches,
- Eliminating the need for the disk to be mounted on the rim ledge,
- Decreasing the concentration of tensions due to a more homogenous distribution of load in the rim, disk and juncture welder,
- Increasing the fatigue stress of the wheel,
- Mounting the tire without the need of a specific tool or specialized workshops,
- Mounting without damaging the tire,
- Elimination of the possibility of accidents with the valve due to the fact that it is mounted outside the tire,
- Improved performance in the tire withdrawal test due to greater length of the first ledge,
- Elimination of the need for a conical laying in the second ledge assuring perfect fitting of the disk without the marks,
- Valve hole in the join region between the bead seat and first ledge, eliminating the possibility of covering the hole by the tire bead.
- Use of standard market valve.
- Laying the valve made by standard process of stamping and wedging, eliminating tension concentrators.
- Elimination of the tension concentrator at the base of the step, with the location of the valve at the junction of the bead seat.

Said advantages will become evident and will be described in greater detail during the course of this specification.

SUMMARY DESCRIPTION OF THE DRAWINGS

Figure 2:
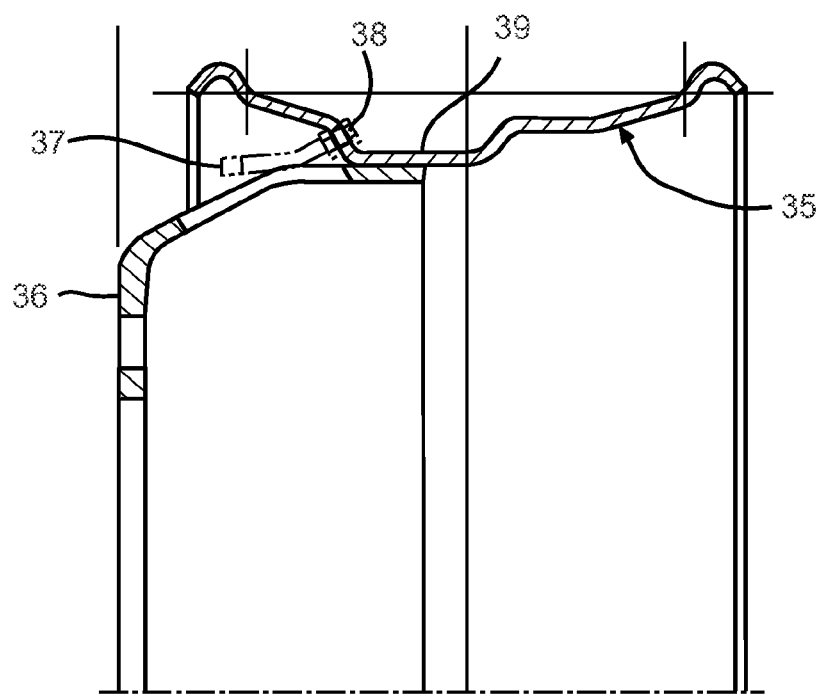
Figure 3:
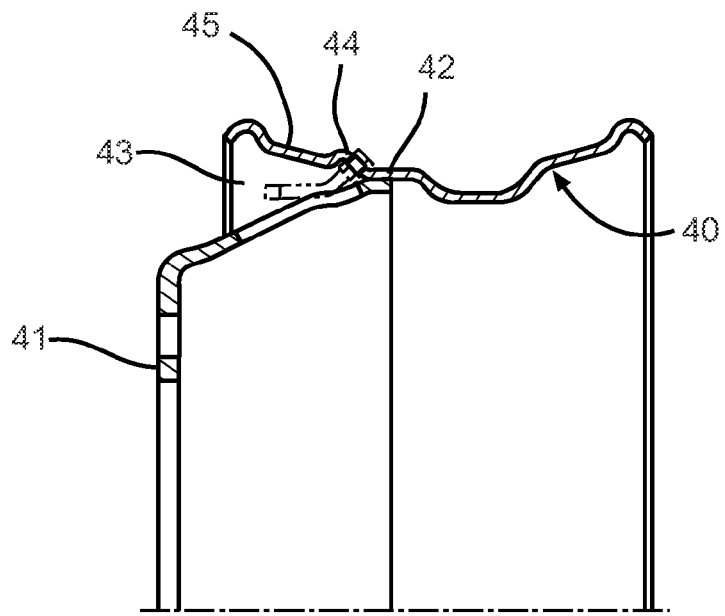
Figure 4:
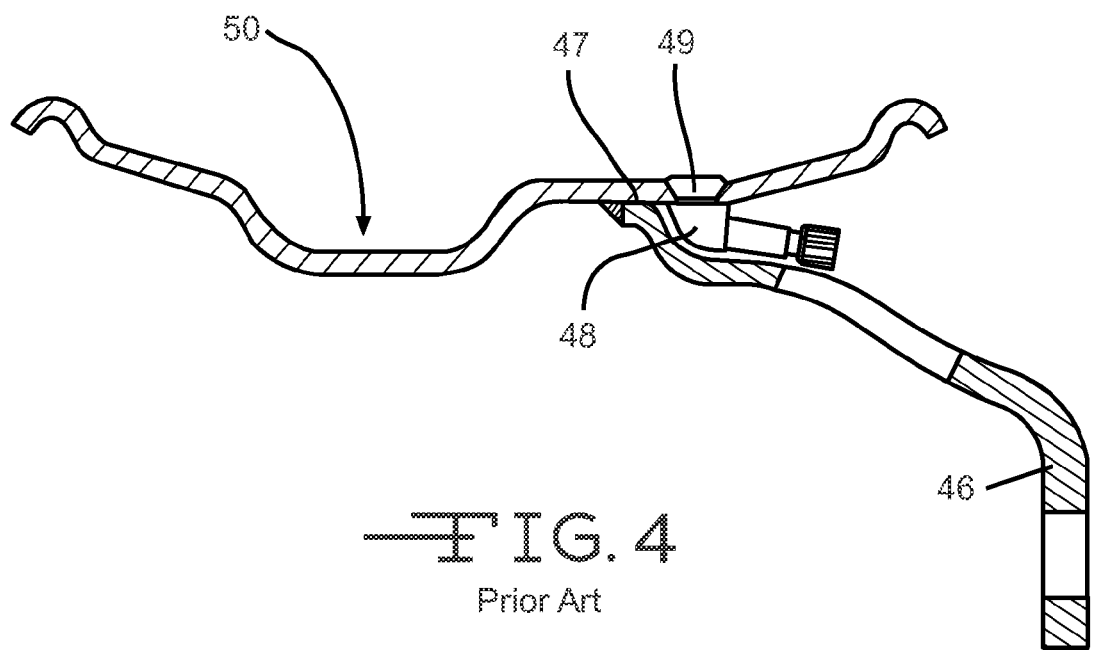
Figure 5:
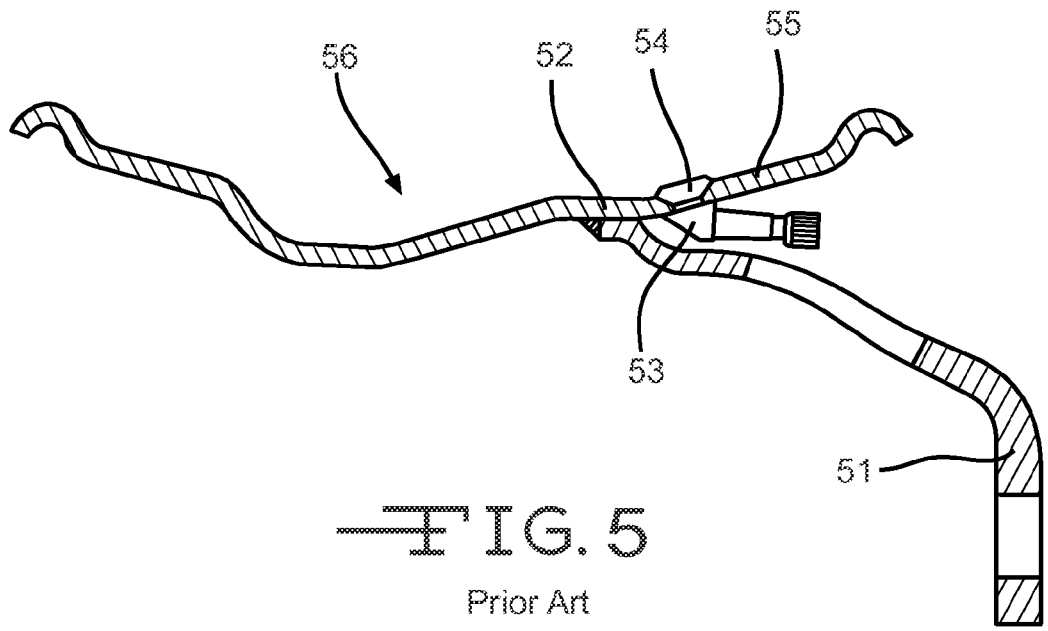
Figure 6:
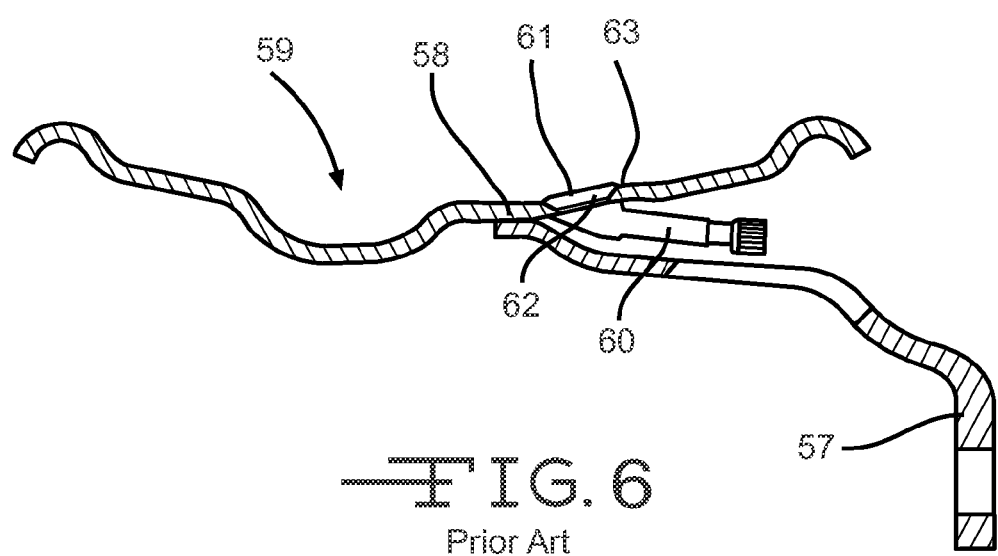
Figure 7:
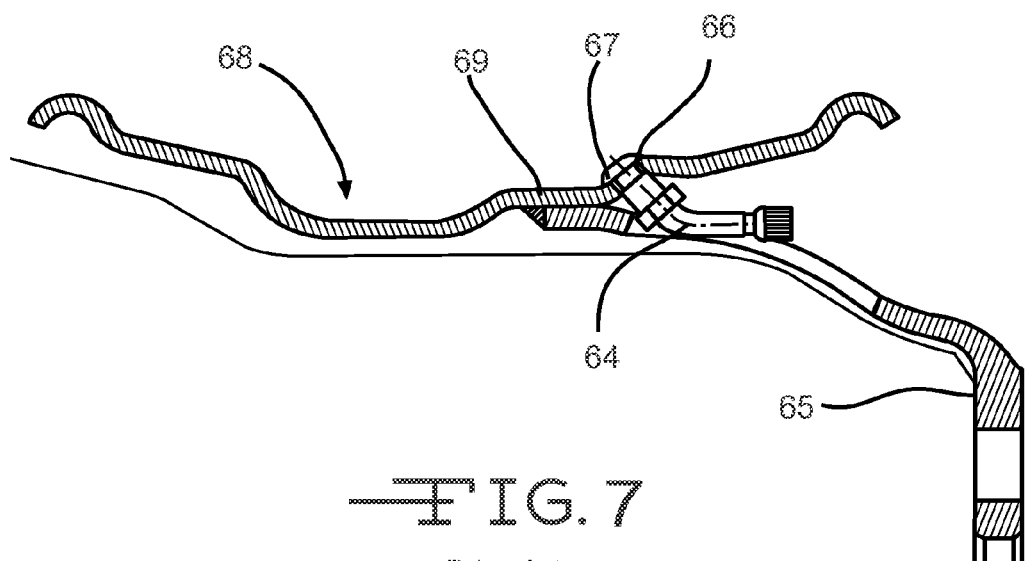
Figure 8:
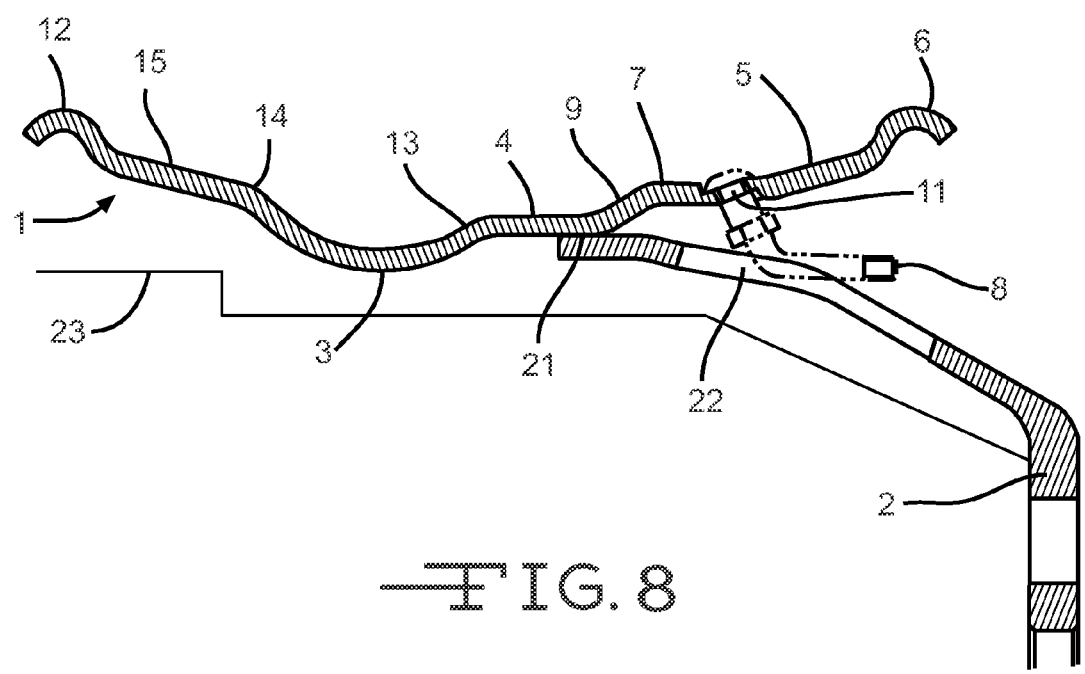
Figure 9:
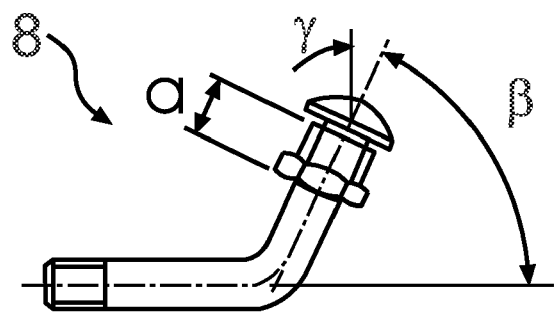
Figure 10A:
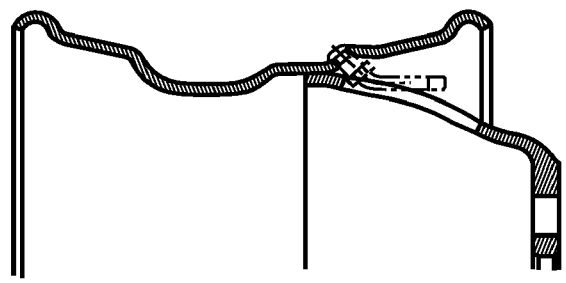
Figure 10B:
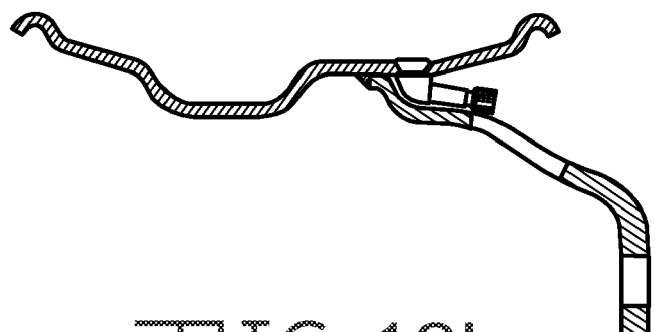
Figure 10C:
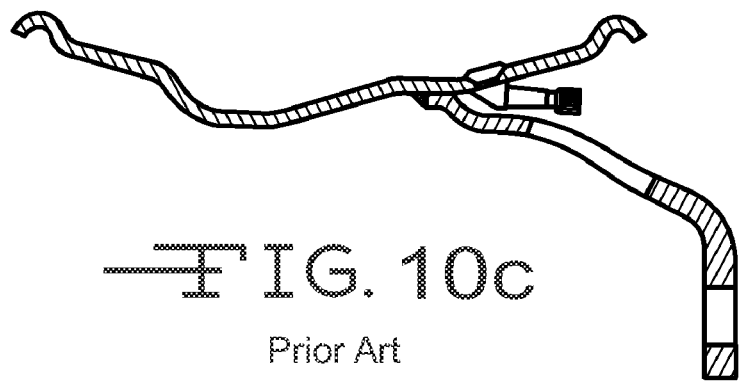
Figure 10D:
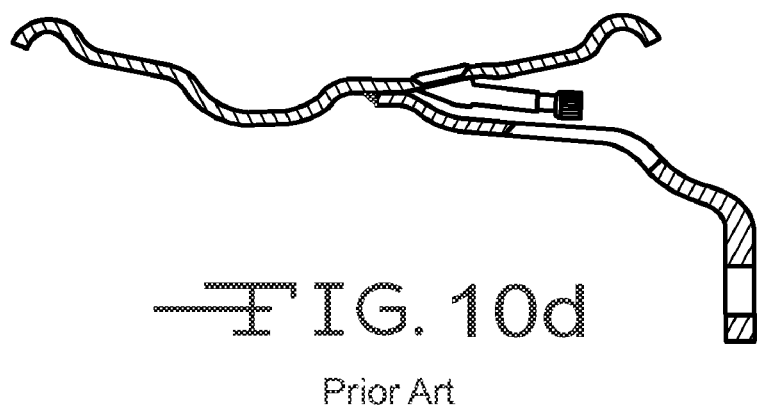
Figure 10E:
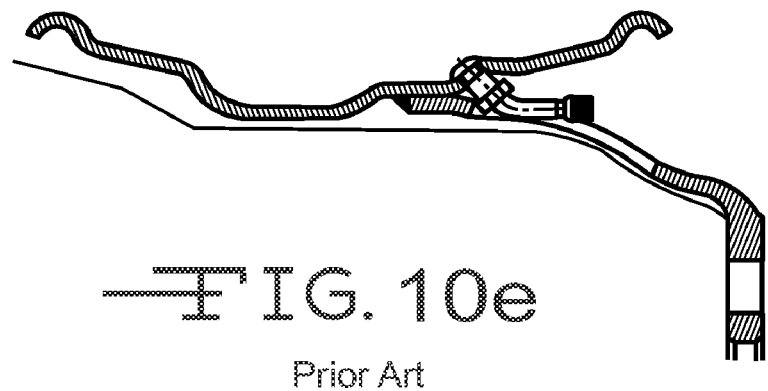
Figure 11:
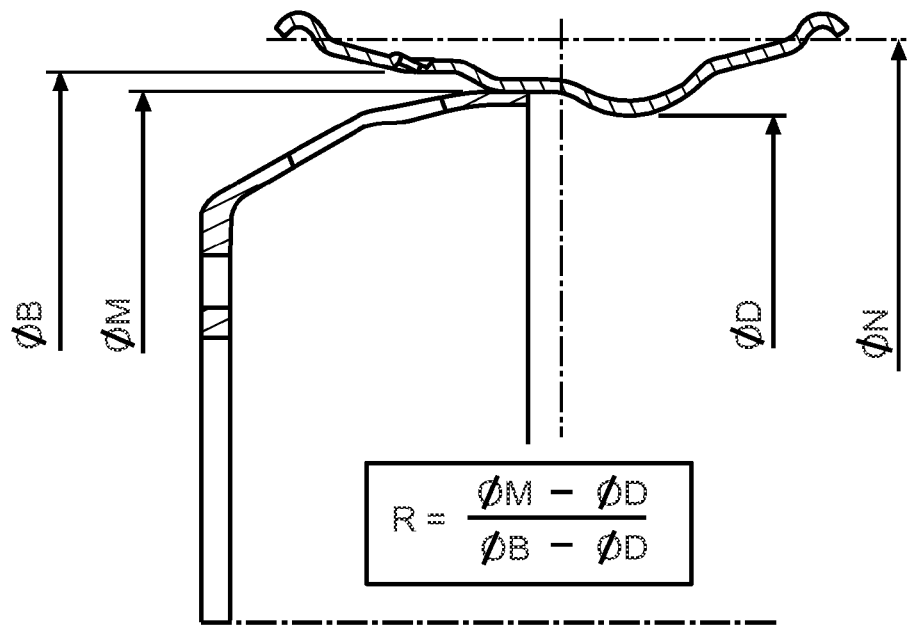
Figure 12:
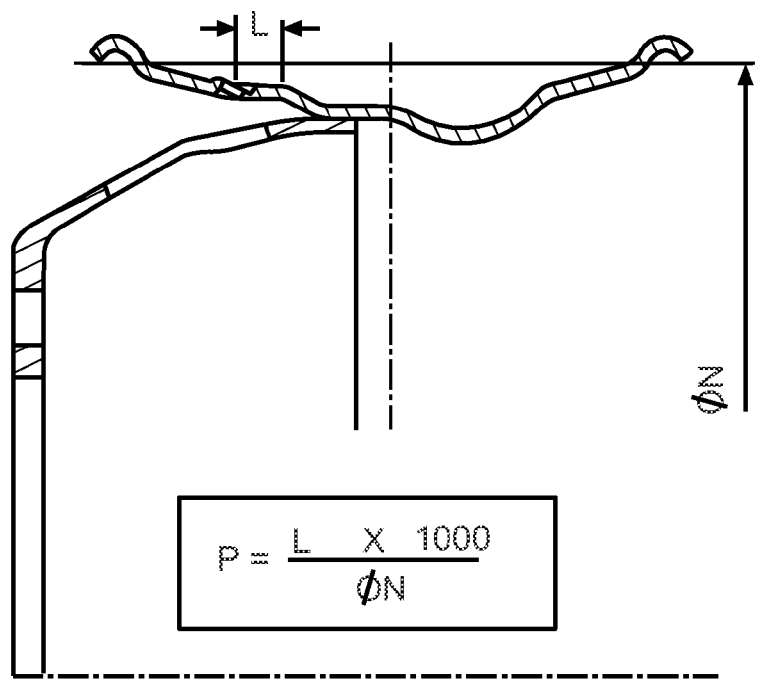
Figure 13:
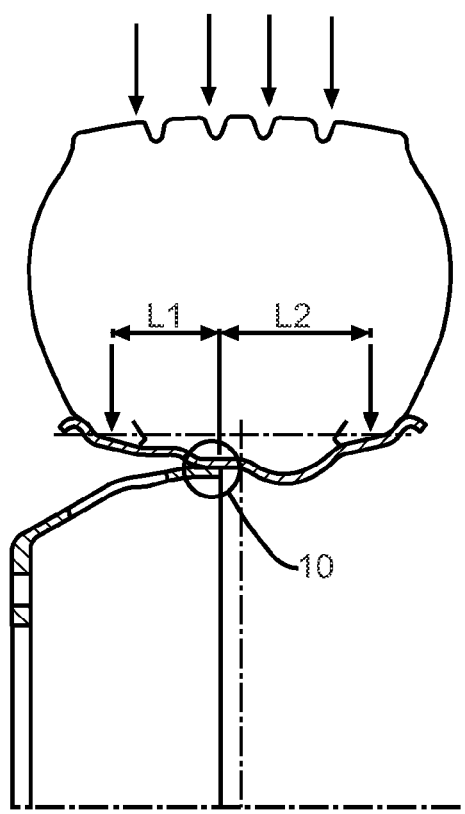
Figure 14:
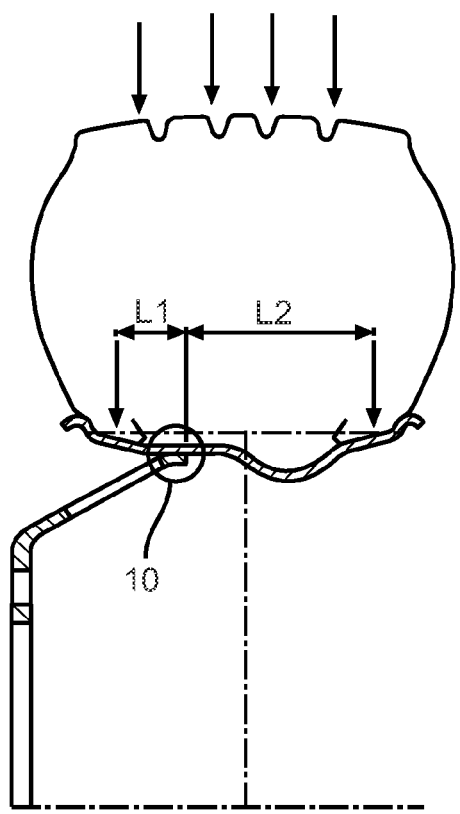

The present invention will now be described in greater detail based on a sample embodiment represented in the drawings, as well as in the drawings that represent prior arts designed to facilitate the understanding of the present invention and its respective improvements and advantages. The figures show:

FIG. 1—a partial cross-section of a tubeless wheel of the state of the art having an internal valve;

FIG. 2—a partial cross-section of a tubeless wheel of the state of the art, with external valve and disk mounted on the rim ledge;

FIG. 3—a partial cross-section of a tubeless wheel of the state of the art with external valve and rim with hump;

FIG. 4—a partial cross-section of a tubeless wheel rim of the state of the art with external valve seated on the rim ledge;

FIG. 5—a partial cross-section of a tubeless wheel rim of the state of the art with external valve seated on the bead seat;

FIG. 6—a partial cross-section of a tubeless wheel rim of the state of the art with external valve seated on the safety device;

FIG. 7—a partial cross-section of a tubeless wheel rim of the state of the art with external valve laid on the wall of the step;

FIG. 8—a partial cross-section of a tubeless wheel with external valve of the object of the present invention;

FIG. 9—a profile view of the new valve used in the assembly of a wheel of the object of the present invention;

FIG. 10*a*—a partial cross-section of a tubeless wheel rim of the state of the art with hump;

FIG. 10*b*—a partial cross-section of a tubeless wheel rim of the state of the art with the valve laying on the ledge;

FIG. 10*c*—a partial cross-section of a tubeless wheel rim of the state of the art with the valve laying on the bead seat;

FIG. 10*d*—a partial cross-section of a tubeless wheel rim of the state of the art with the valve laying on the so-called safety device;

FIG. 10*e*—a partial cross-section of a tubeless wheel rim of the state of the art with the valve laying on the wall of the step;

FIG. 11—a partial cross-section of a tubeless wheel with external valve that is the object of the present invention with the sizes that define ratio "R";

FIG. 12—a partial cross-section of a tubeless wheel with external valve that is the object of the present invention with the sizes that define ratio "L/φ";

FIG. 13—a partial cross-section of a tubeless wheel with external valve that is the object of the present invention with the profile of the tire mounted on the wheel, as well as moment arms;

FIG. 14—a partial cross-section of a tubeless wheel with external valve of the state of the art with the profile of the tire mounted on the wheel, as well as moment arms.

DETAILED DESCRIPTION OF THE DRAWINGS

In a preferred, but not compulsory, embodiment, the wheel developed and now explained refers to an assembly which makes up the wheel formed by the rim, disk and valve.

In order to better define the position of the parts that make up the wheel, all the portions pointing towards the main surface of the disk are defined as 'external' or 'disk'.

FIG. 1 illustrates a partial cross-section of a tubeless wheel of the state of the art. This wheel is comprised of a disk 30 and a rim 31 that comprises an internal valve 32 which is located in a valve orifice 33 present in the outer wall of the rim ledge 34. This kind of construction is used for all sizes of tubeless wheels, for trucks and buses, preferably for use in vehicles equipped with drum brakes.

FIG. 2 shows a partial cross-section of a tubeless wheel of the state of the art. The wheel, comprised by rim 35 and disk 36 presents an external valve 37 located in a valve orifice 38 present on the outer wall of the rim ledge 39. The disk 36 in turn is mounted on the rim ledge 39, it being possible to note a reduction in the diameter available for the brake combination. This kind of construction is used for small and medium sized tubeless wheels, capable of supporting small and medium loads on trucks and buses and preferably applied to vehicles equipped with disk brakes.

FIG. 3 illustrates a partial cross-section of a tubeless wheel of the state of the art that comprises a rim 40 and a disk 41 mounted on the rim ledge 42. The space necessary for placing the valve 43 on the outside of the disk 41 is provided by the hump 44 existing on the rim 40, the valve 43 being located on the wall of the hump 44 of the rim 40. In the construction of the wheel, the junction between the rim 40 and the disk 41 is carried out with the disk 41 mounted on the rim ledge 42.

This type of construction has preferred application vehicles equipped with disk brakes and was initially used in sizes of wheels having a width equal or less than nine inches due to the reduced rim ledge 42 of the rim 40 and, consequently, by the difficulty in placing the valve 43. The solution found was to install the valve 43 in the vertical space created by the hump 44.

It is important to note that the outer diameter of the hump 44 exceeds the start of the bead seat 45. This characteristic, existence of the rib created by the hump 44, is present throughout the entire rim 40 and presents various drawbacks.

Damage may occur in the assembly of the tire if specific tools are not used for this operation, since the tire will have to overcome the barrier created by the hump 44 throughout the perimeter of the rim 40.

FIG. 4 illustrates a typical profile of a tubeless wheel rim 3 with valve outside the disk, laid on the rim ledge of the state of the art, wherein the disk 46 is mounted on the rim ledge 47. The space necessary for placing the valve 48 on the outside of the disk 46 is provided by the valve housing hole 49 existing in the rim 50, the valve 48 being located on the ledge 47 of the rim 50. In the construction of the wheel, the junction between the rim 50 and the disk 46 is carried out with the disk 46 mounted on the rim ledge 47.

FIG. 5 illustrates a typical profile of a tubeless wheel rim 56 with valve outside the disk, laid on the bead seat of the state of the art, where the disk 51 is mounted on the rim ledge 52. The space necessary for placing the valve 53 on the outside of the disk 51 is provided by the valve housing hole 54 existing on the bead seat 55 of the rim 56 the valve 53 being located on the bead 55 of the rim 56. In the construction of the wheel, the junction between the rim 56 and the disk 51 is carried out with the disk 51 mounted on the rim ledge 52.

FIG. 6 illustrates a typical profile of a tubeless wheel rim 59 with valve outside the disk, laid on the safety device of the state of the art, where the disk 57 is mounted on the safety device 63 of the rim 59. The space necessary for placing the valve 60 on the outside of the disk 57 is provided by the valve housing hole 61 existing in the safety device 63 of the rim 59, the valve 60 being located on the ledge 62 of the safety device 63. In the construction of the wheel, the junction between the rim 59 and the disk 57 is carried out with the disk 57 mounted on the rim ledge 58.

FIG. 7 illustrates a typical profile of a tubeless wheel rim 68 with valve outside the disk, laid on the wall of the step 67 of the state of the art, where the disk 65 is mounted on the second ledge 69 of the rim 68. The space necessary for placing the valve 64 on the outside of the disk 65 is provided by the valve housing hole 66 existing on the step 67 of the rim 68, the valve 642 being located on the wall of the step 67. In the construction of the wheel, the junction between the rim 68 and the disk 65 is carried out with the disk 65 mounted on the second rim ledge 69.

FIG. 8 illustrates a profile of the new tubeless wheel with external valve 8, object of the present invention. Once the rim 1 and the valve 8 are developed, there is space on the free external side for the passage of the disk 2. Taking into considering said circumstances, the development of the profile of the disk 2 provides for the following characteristics:

- On the inside, the space is limited by the contours of the brake system 23 and by the respective distance that should be kept therefrom.
- The profile of the disk 2 should pass by these limiting contours and achieve a perfect laying on the second rim ledge 4.
- The profile of the disk should have sufficient height so that it is possible to access it with a welding torch nozzle, on the inside, without the torch knocking the rim ledge 3. It is also important to avoid the weld from getting too close to the initial radius of the rim ledge 3 since a thermally affected zone, due to the high temperature of the weld, may affect the fatigue stress of the wheel.
- The profile of the disk 2 should overcome all these limitations and also present sufficient rigidity to support the specified load and assure the necessary fatigue stress.

This profile was defined by way of latest technology which uses mathematical processes before validating finite elements. This way, it was possible to assure the viability of increasing the space available for placing the valve 8 on the outside of the wheel. It is important to note that the most representative documents of the state of the art (EP0701911); (EP 0 755 807 B1); (EP1 106 388 B1) date from 1995; 1996 and 2000 respectively, a fact that shows the difficulty in finding solutions that are effectively more advantageous.

FIG. 8 shows a partial cross-section of the new wheel rim 1 for placing the valve 8 on the outside of the wheel. The rim 1 will be described in greater detail during the course of this specification, and it is emphasized that the profile of this new rim 1, has its main dimensions rigorously within international standards, including those of the ETRTO (European Tire and RIM Technical Organisation), TRA (Tire and Rim Association—USA) and ALAPA (Associação Latino Americana de Pneus e Aros).

In FIG. 8 it is possible to visualize a partial cross-section of a tubeless wheel that is the object of the present invention, with external valve 8 and comprised of a rim 1 and disk 2.

As described ahead, the space necessary for placing the valve 8 on the outside of the disk 2 is provided by a combination of factors distributed among rim 1, disk 2 and valve 8.

The rim 1 presented in FIG. 8 comprises a rim flange 6 on the side of the disk and an opposite flange 12, the rim flange 6 being adjacent to a bead seat 5 and the opposite flange 12 being adjacent to the opposite bead 15, both bead seats 5 and 15 being slanted, the bead seat 5 is adjacent to a first ledge 7 of the rim 1 which joins to the step of the rim 9, adjacent to the second ledge 4, which joins to the opposite beat 15 by means of the rim ledge 3 by its side wall 13, on the side of the disk 2, and internal wall 14 on the opposite side of the disk 2. The rim 1 also comprises a valve laying region defined by two concurrent planes and exempt of ribs, which are disposed at the junction 10 of the start of the bead seat 5 and the start of the first rim ledge 7.

This new design of the rim 1 allows the placement of the valve 8 in the valve orifice 11 on the first rim ledge 7 due to a new laying angle of 25° on the ledge 4 of the rim on the bead seat 5, compared to the angle of 45° for the case of the prior art in which the valve is laid on the wall of the hump 10. At the same time, the stamping of this new laying considers the lowest possible movement of material, attributing to the rim 1 a structural homogeneity that guarantees an increase of the fatigue stress of the wheel. Additionally, the tire assembly diameter is that of the very first rim ledge 7 which is also equal to the diameter of the start of the bead seat 5, thus avoiding probably damage during the tire assembly, as well as eliminating the need for special tools for this operation.

This new valve 8 laying angle on the rim 1 was taken to the maximum permitted so as not to occur a breakage of material during operation of ledge and valve hole 11.

The step 9 acts as structural reinforcement in a region where the rim 1 is free. With the assembly of the disk 2 on the second ledge 4 of the rim, a fact that contributes to reduce the fatigue stress of the wheel.

On the rim 1 with hump 10, the diameter of the rim ledge 4 is lowered to create space to form a "vertical" wall. With the absence of this rib, the diameter of the first rim ledge 7 is greater, resulting in a most perfect sealing at the start of pressurization, avoiding the need for special tools or extra rubber to fulfill the stage of filling the tire. Tests carried out show that with the rim ledge 7 being greater, the tire retention in the event of emptying in use is totally effective.

Still with reference to FIG. 8, the disk 2 comprises an end portion 21 associated to the rim ledge 4 of the rim 1, the fixing being carried out, in a preferred but not compulsory embodiment, by means of welding. The disk 2 also presents a rectilinear transition section between the end portion 21 and the central section of the disk 2 of the wheel. Additionally, the disk comprises a plurality of ventilation holes 22.

It is important to point out once again that the end height of the disk 2 is greater when compared to the disk 2 of the states of the art used in wheels having the same dimensions. This fact results in a homogeneity of tensions due to the disk of being more flexible, allowing the whole combination of the wheel to work when under load, avoiding overload in the weld of the junction of the rim or even in the components, which prolongs the fatigue stress of the wheel. This fact is proven by the excellent test results summarized below:

TABLE

Test results of the wheel that is the object of the present invention with
R = 0.53 (thus R < 0.65) and ([p/φ × 1000] = 37.98 (thus [p/φ × 1000] > 35)

| Dimension | Sample | Cornering EUWA ES 3.11 Criterion Factor 2 75% Moment 250.000 Cycles | Cornering EUWA ES 3.11 Criterion Factor 2 50% Moment 2.000.000 Cycles | Rolling EUWA ES 3.11 Criterion Factor 2.2 500.000 Cycles | EUWA Biaxial EUWA ES 3.23 Criterion 2 samples at 16.000 Km 1 sample at 24.000 Km |
|---|---|---|---|---|---|
| 9 × 22.5 | 1 | — | — | — | 22.500 Km (t) |
|  | 2 | — | — | — | 40.000 Km (i) |
|  | 3 | 2.399.414 | — | — | — |
|  | 4 | 4.118.369 | — | — | — |
|  | 5 | 3.364.719 | — | — | — |
| 11.75 × 22.5 OffSet 120 | 1 | 654.158 (t) |  |  | — |
|  | 2 | 654.381 (t) |  |  | — |
|  | 3 |  | 2.999.050 (t) |  |  |
|  | 4 |  | 3.670.062 (t) |  |  |
|  | 5 |  |  | 1.000.003 |  |
|  | 6 |  |  | 1.000.008 |  |
|  | 7 | — | — | 1.008.803 | — |
| 11.75 × 22.5 OffSet 0 | 1 | 939.455 (t) |  |  | — |
|  | 2 | — | 4.000.000 (t) |  | — |
|  | 3 |  | 3.250.000 |  |  |
|  | 4 |  |  | 1.000.000 |  |
|  | 5 |  |  | 1.000.321 |  |
|  | 6 | — | — | 1.000.000 | — | t-crack
i-increased assembly interference of rim/disk

By eliminating the hump 10, increasing the step of the rim and consequent decrease in ratio R to less than or equal to 0.60 and also the increase of the first ledge 7 and consequent increase in the ratio [p/φ×1000] upwards of or equal to 37, different to those used by the state of the art (R≧0.65 and [p/φ×1000]≦35) and disclosed by documents (EP0701911); (EP 0 755 807 B1); (EP1 106 388 B1) respectively, a series of benefits is directly achieved, such as:

The valve 8 presented in FIG. 9 completes the combination of this invention by presenting a new exit angle β of 65° compared to the usual angle α of 45° used by the state of the art.

This new exit angle β of 65° of the new valve 8 is complementary to the new seating angle γ of 25° on the rim such that it forms an end positioning angle of 0° in relation to the axis of the wheel. This characteristic is of particular interest to guarantee a positioning of the valve spout which facilities access in the case of a 'simple' assembly of the wheel on the front axis of the vehicle. The positioning angle also facilitates the 'double' assembly of the wheel used in the rear axis of the vehicle when the filling spout complement is mounted.

Additionally, the nut that fixes the valve 8 by the outside of the rim 1, had its "a" height reduced with the aim of facilitating the passage through the body curve of the valve under this new angle, without prejudicing its capacity to tighten or fasten. The "a" height of the nut that fixes the valve 8 was reduced to 10 mm compared to the 14 mm present in the "A" height of this element in the state of the art.

To show the characteristics of the valve 8 mentioned above in better light, FIG. 9 illustrates a profile view of the new valve 8 used in assembling the new wheel. The valve 8 was designed to have a seating angle on the rim 1 which allows the positioning of the spout aligned at 0°. Its lengths and folding radius, as well as the height of the fastening nut, had to be offset to allow the passage of the nut in the body curve during the fastening of the valve 8. The reduction in height of the fastening nut was made but without losing the "thread lines" and, consequently, without prejudice of its capacity to fasten or retain.

The aim of FIGS. 10a to 10e is to show the notorious differences between the wheels of the state of the art with such as: a wheel with the valve in the hump 10 (see FIG. 10a an 10e), a wheel with the valve on the ledge 4 of the rim (see FIG. 10b) or a wheel with the valve on the bead seat 5 (see FIG. 10c and 10d). This image compares the profiles of the five wheels rendering explicit what was set forth previously.

In FIG. 10a is presented a wheel of the state of the art with hump 10. It is evident that the effort needed to assemble the tire is greater on the rim 1 of the state of the art, due to the presence of the hump 10 than on the rim 1 that is the object of the present invention.

In FIG. 10b is presented a wheel of the state of the art with seating of the valve on the ledge. These figure shows that the flat ledge or ratio R from 0.65 does not offer reinforcement for this region of the rim better than on the rim 1 that is the object of the present invention. Additionally, the simple removal of material to house the valve through machining may act as tension concentrator.

In FIG. 10c is presented a wheel of the state of the art with seating of the valve on the bead seat. Besides the observations made in relation to FIG. 10b, it is clear that the positioning of the valve, directly on the bead seat presents the risk that the filling spout may have its orifice covered by the tire bead, preventing air from entering inside the tire. This fact does not occur on the rim 1 object of the present invention.

In FIG. 10d, is presented a wheel of the state of the art with seating of the valve on the so-called safety device. Besides the observations made in relation to FIG. 10b, it is clear that the positioning of the valve and the creation of a mini ledge adjacent to the bead seat on the side of the disk, is ineffective in protecting the tire from drawing free in the event of running on low pressure, resulting from a loss of pressure. This fact does not occur with the rim 1 object of the present invention.

In FIG. 10e is presented a wheel of the state of the art with seating of the valve on the wall of the step or transition area.

Thus, it remains clear that the positioning of the valve on the wall of the step requires that the ledge to house the valve, even if by stamping and wedging, must be located near the start of the step, region adjacent to the second ledge. This acts as a major tension concentrator, reducing the fatigue stress of the wheel.

Additionally, we can ensure that the ledge in width "L" restrict to the ratio ($[L/\phi \times 1000] \leq 35$), offers inferior action against detachment of the tire when compared ($[p/\phi \times 1000] \geq 37$) proposed in the rim 1 that is the object of the present invention.

Another advantage proposed in the rim 1 that is the object of the present invention, the fact that the larger "L" on the first ledge 7 requires that the second ledge 4 has its size reduced to the minimum necessary to guarantee the assembly of the disk and welding of the junction. This recourse eliminates the need for tapering in this region guaranteeing the perfect laying of the disk, and also eliminates flanges which are also tension concentrators.

We further cite as an advantage proposed in rim 1 the dimension "D1" which shows greater depth of the disk which allows greater flexibility of the component and consequent homogenous work of the rim and weld, avoiding the concentration of tension in the welder region due to a very rigid disk or very large deformation of a rim without step reinforcement.

For a first example, in a tubeless wheel with external valve that is the object of the present invention, sized 571.5.times.298.5 mm (22.5.times.11.75 inches) for the disk and rim, the ratio R is 0.555 and $[L/\Phi_N \times 1000]$ is 37.97.

For a second example, in a tubeless wheel with external valve that is the object of the present invention, sized 571.5.times.228.6 mm (22.5.times.9.00 inches) for the disk and rim, the ratio R is 0.536 and $[L/\Phi_N \times 1000]$ is 37.97.

For a third example, in a tubeless wheel with external valve that is the object of the present invention, sized 444.5.times.171.45 mm (17.5.times.6.75 inches) for the disk and rim, the ratio R is 0.588 and $[L/\Phi_N \times 1000]$ is 38.20.

Additionally, FIG. 13 illustrates the contour of a tire when mounted on the rim 1 that is the object of the present invention and FIG. 14 illustrates the contour of a tire when mounted on the rim 1 of the state of the art.

It should be understood that the scope of the present invention encompasses other possible variations besides the embodiment described and illustrated herein. Accordingly, the invention is limited only by the content of the claims appended hereto, potential equivalents being included therein.

The invention claimed is:

1. Tubeless steel wheel for vehicles intended for the transport of loads or large number of passengers, trucks or buses, the wheel comprised of a rim (1) and a disk (2), wherein the rim (1) is sized equal or greater than about 5.25 inches in width, wherein the rim (1) comprises, beginning from a side where the disk (2) is mounted, a first rim flange (6), adjacent to a first bead seat (5), the bead seat (5) being adjacent to a first rim ledge (7), the first ledge (7) joining a ramp (9), the ramp (9) being adjacent to a second ledge (4), which joins a rim ledge (3) by means of a side wall (13), an internal wall (14), which joins the rim ledge (3) to a second bead seat (15), and a second rim flange (12) adjacent to the second bead seat (15), wherein the disk (2) includes an end portion (21) disposed adjacent to the second rim ledge (4), and wherein the wheel includes a valve hole (11) disposed at a junction point (10) defined at an intersection between the bead seat (5) and the first ledge (7).

2. Wheel according to claim 1 wherein the first ledge (7) adjacent to the bead seat (5) on the side of the disk (2) has a width "L", with a diameter equal to that of a start of the bead seat (5) and also, the diameter of the wheel is $\Phi_N$, where a ratio $$L/\Phi_N \times 1000$$

is equal or greater than 37.

3. Wheel according to claim 1 wherein a valve (8) disposed in the valve hole has a seating angle of 25° in relation to an axis of the wheel.

4. Wheel according to claim 1 wherein a valve (8) disposed in the valve hole has an exit angle (α) of 65°, forming an end positioning angle of 0° in relation to an axis of the wheel.

5. Wheel according to claim 1 further including a valve disposed in said valve hole.

6. Tubeless steel wheel for vehicles intended for the transport of loads or large number of passengers, trucks or buses, the wheel comprised of a rim (1) and a disk (2) and the rim (1) is sized equal or greater than about 5.25 inches in width, wherein the rim (1) comprises, beginning from a side where the disk (2) is mounted, a first rim flange (6), adjacent to a first bead seat (5), the bead seat (5) being adjacent to a first rim ledge (7), the first ledge (7) joining a ramp (9), the ramp (9) being adjacent to a second ledge (4), which joins a rim ledge (3) by means of a side wall (13), an internal wall (14), which joins the rim ledge (3) to a second bead seat (15), and a second rim flange (12) adjacent to the second bead seat (15), wherein the disk (2) includes an end portion (21) disposed adjacent to the second rim ledge (4), wherein $\Phi_D$ defines a diameter of a radially inner surface of the rim ledge (3) of the rim (1), $\Phi_M$ defines a diameter of a radially inner surface of the second ledge (4), $\Phi_N$ defines a diameter of a radially inner surface of the rim at a point lower than a start of the bead seats (5, 15), and $\Phi_B$ defines a diameter at a radially inner surface of the rim at a point of junction (10) defined at an intersection between the bead seat (5) and the first ledge (7) of the rim, where a ratio $$R = \frac{(\phi_M - \phi_D)}{(\phi_B - \phi_D)}$$

is equal or less than 0.60.

7. Wheel according to claim 6 further including a valve disposed in a valve hole provided in said rim.

\* \* \* \* \*